United States Patent
Prevo et al.

(10) Patent No.: US 7,995,873 B2
(45) Date of Patent: Aug. 9, 2011

(54) FIBER OPTIC SENSOR APPARATUS

(75) Inventors: Justin Prevo, Petoskey, MI (US); Larry J. Terpstra, Central Lake, MI (US)

(73) Assignee: Honeywell International Inc., Morristown, NJ (US)

( * ) Notice: Subject to any disclaimer, the term of this patent is extended or adjusted under 35 U.S.C. 154(b) by 308 days.

(21) Appl. No.: 12/411,924

(22) Filed: Mar. 26, 2009

(65) Prior Publication Data

US 2010/0158432 A1    Jun. 24, 2010

Related U.S. Application Data

(60) Provisional application No. 61/140,279, filed on Dec. 23, 2008.

(51) Int. Cl.
*G02B 6/00* (2006.01)
(52) U.S. Cl. ............ 385/12; 385/127; 385/128; 385/129
(58) Field of Classification Search .................... 385/12, 385/127, 128, 129
See application file for complete search history.

(56) References Cited

U.S. PATENT DOCUMENTS

| | | | |
|---|---|---|---|
| 5,513,295 A | 4/1996 | Go | 385/137 |
| 5,659,647 A | 8/1997 | Kravitz et al. | 385/52 |
| 6,212,324 B1 | 4/2001 | Lin et al. | 385/136 |
| 6,778,740 B2 | 8/2004 | Medberry et al. | 385/52 |
| 6,814,503 B2 | 11/2004 | Hall et al. | 385/91 |
| 6,853,795 B2 * | 2/2005 | Dagley et al. | 385/134 |
| 7,218,827 B2 | 5/2007 | Vongseng et al. | 385/135 |
| 7,274,845 B2 | 9/2007 | Khor | 385/52 |
| 7,277,620 B2 * | 10/2007 | Vongseng et al. | 385/135 |
| 7,327,907 B2 | 2/2008 | Shaibani et al. | 385/12 |
| 7,407,330 B2 | 8/2008 | Smith et al. | 385/53 |

* cited by examiner

*Primary Examiner* — Jennifer Doan
(74) *Attorney, Agent, or Firm* — Shumaker & Sieffert, P.A.

(57) ABSTRACT

A fiber optic sensor apparatus includes an optical fiber, a fiber bend holder, and a sensing element. The optical fiber can be configured to form a transmit fiber path and a return fiber path by adhering the fiber bend holder to the center of the optical fiber in order to form a straight section between the transmit fiber path and the return fiber path. The optic fiber can be physically bent and adhered to tabs associated with the fiber bend holder. A cut can be precisely made in the center of the adhered straight section and the sensing element can be inserted into an optical path associated with the optical fiber.

20 Claims, 3 Drawing Sheets

FIBER OPTIC SENSOR APPARATUS

This application claims the benefit of U.S. Provisional Application No. 61/140,279, filed Dec. 23, 2008, and entitled "Surface Acoustic Wave Based Micro-Sensor Apparatus and Method for Simultaneously Monitoring Multiple Conditions," which is hereby incorporated by reference in its entirety.

TECHNICAL FIELD

Embodiments are generally related to sensor methods and systems. Embodiments are also related to fiber optic sensors. Embodiments are additionally related to fiber bend holders.

BACKGROUND OF THE INVENTION

Fiber-optic communication involves the transmission of information from one place to another by sending pulses of light via an optical fiber. The light forms an electromagnetic carrier wave that can be modulated to carry data. Such optical fiber devices can be utilized in communications and sensing applications due to their inherent advantages in bandwidth, size, weight, immunity to electromagnetic interference, and ruggedness. In general, a fiber optic sensor includes a transmit fiber path and a return fiber path through which a light wave can travel to and from interfacing electronics. The transmit fiber path and the return fiber path can be separated by a sensing element gap in which an optical sensor can be disposed.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved fiber optic sensor apparatus.

It is another aspect of the present invention to provide for an improved fiber bend holder for retaining a small bend radius in an optical fiber.

It is a further aspect of the present invention to provide for an improved method for assembling the fiber optic sensor apparatus.

The aforementioned aspects and other objectives and advantages can now be achieved as described herein. A fiber optic sensor apparatus and method of forming the same are disclosed. The apparatus includes an optical fiber, a fiber bend holder, and a sensing element. The fiber bend holder (e.g., glass) can be adhered to the center of the optical fiber in order to form a straight section between the transmit fiber path and the return fiber path. The optic fiber can be physically bent and connected to tabs associated with the fiber bend holder. The optical fiber can be configured to form a transmit fiber path and a return fiber path by precision cutting the center of the adhered optical fiber section lengthwise. The sensing element can be inserted into the precision cut associated with the optical fiber.

The optical fiber generally includes an inner core having a particular index of refraction and an outer cladding peripherally surrounding the core. The cladding possesses a lower index of refraction than the core. The fiber bend holder can be configured with a tee shape, thereby creating the tabs for securing the optical fiber. By first adhering the optical fiber while allowed to be in a stress-free state, a maximum light wave coupling from the transmit path to the return path via the sensing element can be achieved.

The fiber bend holder maintains an alignment between the transmit fiber path and the return fiber path of a loop of optical fiber having a small bend radius, in which a sensor can be disposed. The straight section allows a light wave to pass via the sensing element and a maximum amount of the light wave can be coupled back into the return fiber path thereby eliminating losses due to an angular offset. Such an approach minimizes optical losses associated with the angular offset and improves sample to sample power output consistency.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
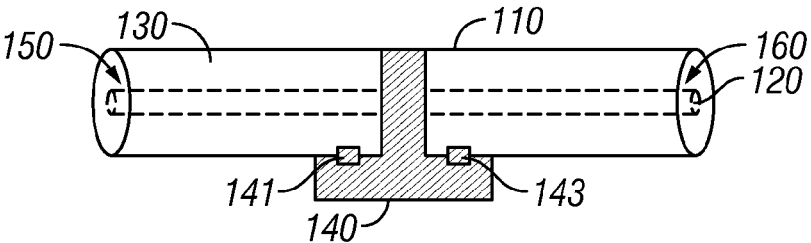
FIG. 1 illustrates a perspective view of a fiber optic sensor apparatus associated with a fiber bend holder, in accordance with an embodiment.

FIG. 1 illustrates a perspective view of a fiber optic sensor apparatus 100 associated with a fiber bend holder 140, in accordance with an embodiment. The fiber optical sensor apparatus 100 is composed of optical fiber, which can be utilized in a wide variety of communication environments such as, for example, telecommunications, networking, data communications, industrial communication links, medical communications links, etc. The optical fiber 110 includes an inner core 120 having a particular index of refraction and an outer cladding 130 peripherally surrounding the core 120. The cladding 130 possesses a lower index of refraction than the core 120.

The transmission of light via the optical fiber 110 is based on the phenomenon of total internal reflection. The optical fiber 110 is capable of propagating a light wave with extremely low losses and acceptably low dispersion. The optical fiber 110 transmits digital and analog information via modulated optical signals. The optical fiber 110 may be configured from a material such as, for example, glass depending upon design considerations. It can be appreciated that other types of materials may be utilized in place of the suggested material.

The apparatus 100 further includes a transmit fiber path 150 and a return fiber path 160. The light wave from a light source (not shown) can be transmitted via the transmit fiber path 150 and the light wave that emerges from the return fiber path 160 can be detected and reconverted into electronic signals in order to reproduce the original signal. The light source may be any device capable of producing light in optic sensor apparatus 100 such as, for example, a laser diode, a light emitting diode, a super-luminescent diode or the like. The light beam can be guided along the length of the core 120 by total internal reflection as the refractive index of the core 120 exceeds that of the cladding 130.

Figure 2:
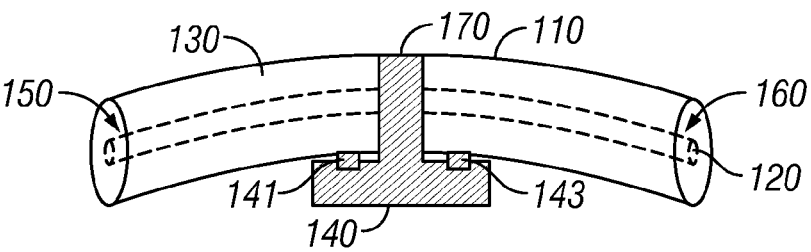
FIG. 2 illustrates a perspective view of the fiber optic sensor apparatus associated with the fiber bend holder, in accordance with an embodiment.

FIG. 2 illustrates a perspective view of the fiber optic sensor apparatus 100 associated with the fiber bend holder 140, in accordance with an embodiment. Note that in FIGS. 1-6, identical or similar blocks are generally indicated by identical reference numerals. The fiber bend holder 140 can be adhered to the center of the optical fiber 110 in order to form a straight section 170 between the transmit fiber path 150 and the return fiber path 160. The fiber bend holder 140 can be configured in a tee shape, which contains one or more tabs 141 and 143 for securing the optical fiber 110. The refractive index of the core 120 is higher than that of the cladding 130 for the light to be guided by the optical fiber 110. The optical fiber 110 may be configured from a material such as, for example, glass again depending upon design considerations. It can be appreciated that other types of materials may be utilized in place of the suggested material.

The transmit fiber path 150 and return fiber path 160 can be physically bent and adhered into place to the tabs 141 and 143 of the fiber bend holder 140. One piece of fiber is adhered in place and then cut. It is this process that aligns both fibers paths accurately and reduces coupling losses. Optical losses are reduced through the sensor optical path (e.g., angular losses). This can be achieved by configuring the optical path as follows. First, the middle of one optical fiber can be adhered to the fiber holder, which itself can be configured in an "upside-down" tee shape arrangement. Second, two fiber legs are created. Each fiber leg is adhered to its associated tab present on the tee holder. Third, a precision slot can be cut in the holder where the fiber was first adhered. Such a slot is for placement of a sensing element. Fourth, once the slot is cut, a transmitting path and a return path are created through the sensing element.

Figure 3:
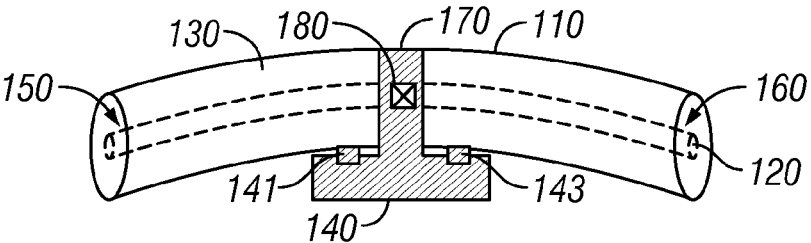
FIG. 3 illustrates a perspective view of the fiber optic sensor apparatus associated with a sensing element, in accordance with an embodiment.

FIG. 3 illustrates a perspective view of the fiber optic sensor apparatus 100 associated with a sensing element 180, in accordance with an embodiment. A precision cut can be formed in the center of the adhered straight section 170 and the sensing element 180 can be inserted into an optical path associated with the optical fiber 110. The active sensing element 180 may be made of any material capable of changing the optical path of light passing through it in response to environmental conditions such as, for example, temperature, pressure, breaks or stresses, properties of chemical species, a change in a magnet field near the sensing element, etc. It can be appreciated, however, that other embodiments and hence, other sensing applications, are equally possible. Potential sensing applications include those of a proximity sensor and a limit switch, which are both essentially sensors of distance. The disclosed fiber optic holder can be employed in a number of other possible sensing applications.

The sensing element 180 can be placed between the transmit fiber path 150 and the return fiber path 160. The light wave is typically modulated into signal pulses at a high frequency and launched into the fiber transmit path 150. The signal pulses in the transmit fiber path 150 are transmitted to the return fiber path 160 through the sensing element 180 and the signal is demodulated. The straight section 170 in the center of the transmit fiber path 150 and the return fiber path 160 provides a maximum light wave coupling from the transmit fiber path 150 to the return fiber path 160 via the sensing element 180. Such a configuration can be accomplished by first adhering one piece of fiber, which is aligned straight with the fiber holder and then cutting through the center of the adhered portion, which results in a significant reduction in angular losses. Mainly, however, a reduction in angular losses is achieved, which can be a significant source of power loss. Note that maximum wave coupling generally constitutes the minimal amount of angular offset losses between transmission and return fiber paths. Such a maximum wave coupling can be easily determined by securing and fastening the fiber 110 in a straight configuration and then cutting the fiber 1101 this ensures a minimum amount of loss due to an angular offset.

The optical fiber 110 typically possess very small cross-sections and narrow acceptance angles within which light entering the fiber 110 must fall to promote efficient propagation of the light along the fiber 110. It is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 4:
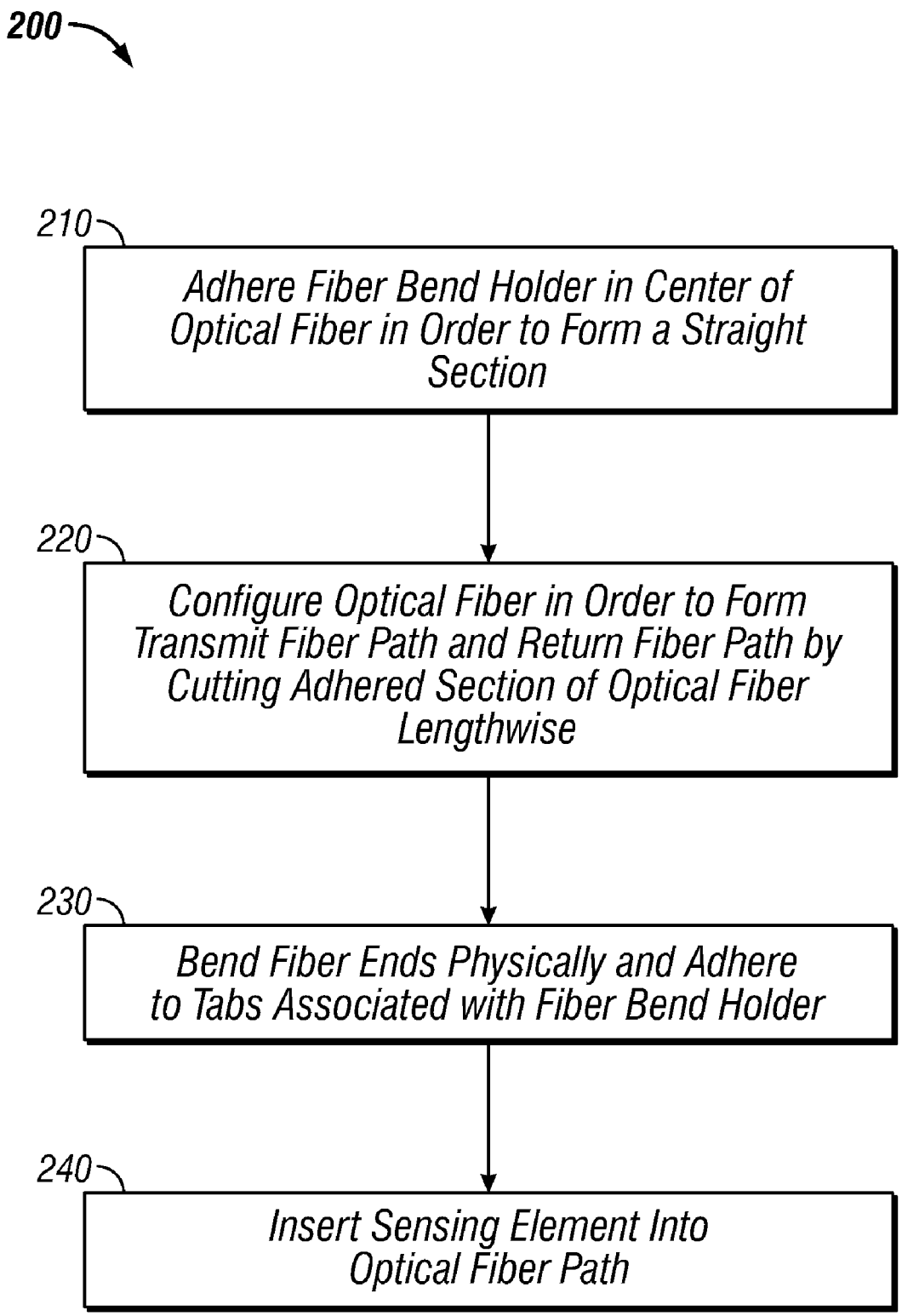
FIG. 4 illustrates a detailed flow chart of operations illustrating logical operational steps of a method for assembling a transmit fiber path and a return fiber path associated with the fiber optic sensor apparatus, in accordance with an embodiment.

FIG. 4 illustrates a detailed flow chart of operations illustrating logical operational steps of a method 200 for assembling the transmit fiber path 150 and the return fiber path 160 associated with the fiber optic sensor apparatus 100, in accordance with an embodiment. Again as reminder, in FIGS. 1-4, identical or similar blocks are generally indicated by identical reference numerals. The fiber bend holder 140 can be adhered in the center of the optical fiber 110 in order to form the straight section 170, as depicted at block 210. The optical fiber 110 can be configured to form the transmit fiber path 150 and the return fiber path 160 by cutting the optical fiber 110 lengthwise, as shown at block 220. The optical fiber 110 can be bent physically and adhered to tabs associated with the fiber bend holder 140, as illustrated at block 230.

The sensing element 180 can then be inserted into precision cut, as depicted at block 240. The fiber bend holder 140 maintains an alignment of the transmit fiber path 150 and the return fiber path 160 by retaining a small bend radius in the optical fiber 110 for placement into the sensor. The transmit fiber path 150 and said return fiber path 160 are generally configured to maintain an alignment and a compact overall package size between the transmit fiber path 150 and the return fiber path by 160 retaining the small bend radius in said optical fiber 110. The small bend radius itself does not maintain an alignment, but does maintain the small and compacting overall package size. The "small" bend radius can be, for example, less than a 3 mm radius, but other sizes are possible.

The straight section 170 allows the light wave to pass through the sensing element 180 and a maximum amount of the light wave can be coupled back into the return path 160 thereby eliminating losses due to an angular offset or at least rendering such losses irrelevant with respect to overall losses in the system. Note that the "maximum amount" can be defined as the greatest amount of light transfer from elimination of angular offset losses. The sensing element 180 is thus disposed into an optical path associated with the optical fiber 110, such that the straight section 170 allows a light wave(s)

to pass with a reduction of angular offset losses to a point where such losses are irrelevant in the context of the total optical system loss via the sensing element 180 and a portion of the light wave(s) to return into the return fiber path 160.

Regarding elimination of losses due to angular offset, it can be appreciated that such losses cannot be 100% eliminated. The disclosed assembly, however, allows for the elimination of angular offset losses in the optical system. There are still losses due to the bends in the fiber 110 and due to transmission losses between medium transitions.

Figure 5:
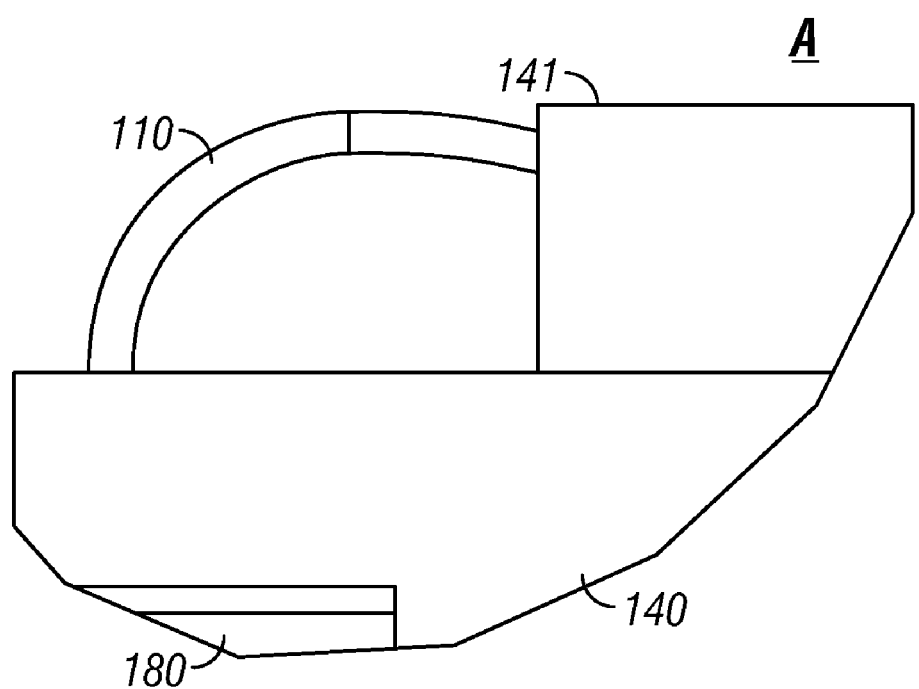
FIGS. 5-6 illustrate respective side and sectional views of a fiber optic assembly, which can be implemented in accordance with an embodiment.
Figure 6:
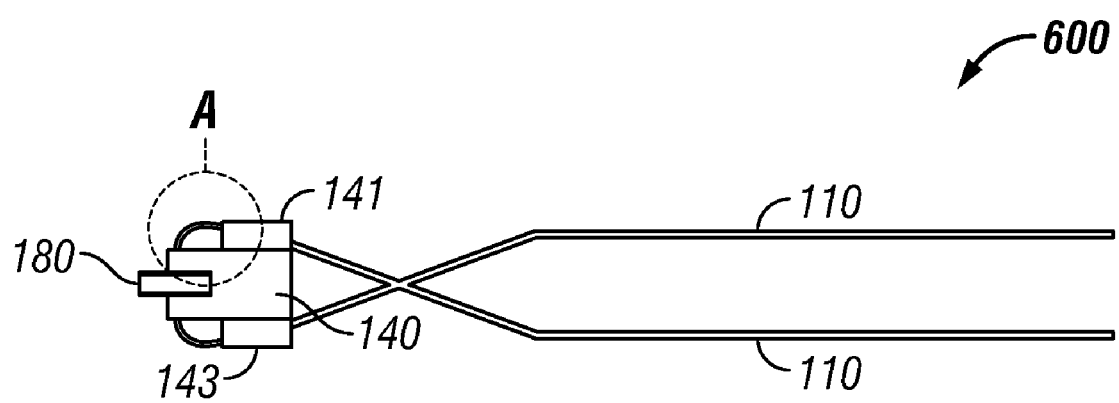

FIGS. 5-6 illustrate respective side and sectional views of a fiber optic assembly 600, in accordance with an embodiment. Section A depicted in FIG. 6 is shown in more detail in FIG. 5. Note that in FIGS. 1-6, identical or similar parts or elements are indicated by identical reference numerals. The configuration depicted in FIGS. 5-6 serves to illustrate an overall fiber optic assembly 600 in which the optical fiber 110 can be can be implemented. FIGS. 5-6 are thus to be interpreted together and with respect to the configurations depicted in FIG. 1-4.

The fiber optic assembly 600 generally includes a fiber bend holder tab 141 and a fiber bend holder tab 143, which are analogous to tabs 141 and 143 described earlier herein. A fiber bend holder 140 is also illustrated in FIG. 5 with respect to the sensing element 180 and the fiber holder tab 141. The sensing element 180 is disposed into an optical path associated with the optical fiber 110. The optical fiber 110 can be configured to possess very small cross-sections and narrow acceptance angles within which light entering the fiber 110 must fall to promote efficient propagation of the light along the fiber 110. Note that the fiber optic assembly 600 can be utilized in association with the fiber optic sensor apparatus 100.

The disclosed embodiments may provide other advantages such as minimizing the optical losses associated with angular offsets and improving sample to sample power output consistency. Various alterations and modifications will occur to those skilled in the art from the foregoing detailed description of the invention and the accompanying drawings. Such a fiber optic sensor apparatus 100 can be utilized, for example, in harsh environments.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A fiber optic sensor apparatus, comprising:
   a transmit fiber path and a return fiber path associated with an optical fiber, wherein said optical fiber is adhered to a fiber bend holder, such that a straight section is located between said transmit fiber path and said return fiber path;
   at least one tab associated with said fiber bend holder, wherein said optical fiber is adhered into place by said at least one tab; and
   a sensing element disposed in an optical path associated with said optical fiber, wherein said straight section allows a light wave to pass with minimal angular offset losses through said sensing element.

2. The apparatus of claim 1 wherein said straight section is cut perpendicular to an axis of said optical fiber.

3. The apparatus of claim 1 wherein said transmit fiber path and said return fiber path are configured to maintain an alignment and a compact overall package size between said transmit fiber path and said return fiber path by retaining a small bend radius in said optical fiber.

4. The apparatus of claim 1 further comprising a maximum light wave coupling from said transmit fiber path to said return fiber path via said sensing element utilizing said straight section.

5. The apparatus of claim 1 wherein said straight section reduces losses between said transmit fiber path and said return fiber path.

6. The apparatus of claim 1 wherein said fiber bend holder comprises a glass material.

7. The apparatus of claim 1 wherein said optical fiber comprises a glass material.

8. The apparatus of claim 1 wherein said fiber bend holder comprises a tee shape.

9. A fiber optic sensor apparatus, comprising:
   a transmit fiber path and a return fiber path associated with an optical fiber, wherein said optical fiber is adhered to a fiber bend holder, such that a straight section is located between said transmit fiber path and said return fiber path; and
   a sensing element disposed into an optical path associated with said optical fiber, wherein said straight section allows a light wave to pass with a reduction of angular offset losses via said sensing element and a portion of said light wave to return into said return fiber path, such that said angular offset losses are irrelevant with respect to overall optical losses thereof.

10. The apparatus of claim 9 further comprising at least one tab associated with said fiber bend holder, wherein said optical fiber is adhered into place by said at least one tab, said fiber bend holder providing said at least one tab for securing said optical fiber.

11. The apparatus of claim 9 wherein said straight section is cut perpendicular to an axis of said optical fiber.

12. The apparatus of claim 9 wherein said transmit fiber path and said return fiber path maintain an alignment and a compact overall package size between said transmit fiber path and said return fiber path by retaining a small bend radius in said optical fiber.

13. The apparatus of claim 9 further comprising a maximum light wave coupling from said transmit fiber path to said return fiber path via said sensing element utilizing said straight section.

14. The apparatus of claim 9 wherein said straight section reduces losses between said transmit fiber path and said return fiber path.

15. The apparatus of claim 9 wherein said fiber bend holder comprises a tee shape.

16. A fiber optic sensor apparatus, comprising:
   a transmit fiber path and a return fiber path associated with an optical fiber, wherein said optical fiber is adhered to a fiber bend holder, such that a straight section is located between said transmit fiber path and said return fiber path, wherein said straight section is cut perpendicular to an axis of said optical fiber and reduces losses between said transmit fiber path and said return fiber path; and
   a sensing element disposed into an optical path associated with said optical fiber, wherein said straight section allows a light wave to pass with a reduction of angular offset losses via said sensing element and a portion of said light wave to return into said return fiber path, such that said angular offset losses are irrelevant with respect to overall optical losses thereof.

17. The apparatus of claim 16 further comprising at least one tab associated with said fiber bend holder, wherein said optical fiber is adhered into place by said at least one tab, said fiber bend holder providing said at least one tab for securing said optical fiber.

18. The apparatus of claim 16 wherein said transmit fiber path and said return fiber path maintain an alignment and a compact overall package size between said transmit fiber path and said return fiber path by retaining a small bend radius in said optical fiber.

19. The apparatus of claim 16 further comprising a maximum light wave coupling from said transmit fiber path to said return fiber path via said sensing element utilizing said straight section.

20. The apparatus of claim 16 wherein said fiber bend holder comprises a tee shape.

* * * * *